United States Patent [19]
Jordan, Jr.

[11] Patent Number: 5,063,504
[45] Date of Patent: Nov. 5, 1991

[54] INFORMATION CONTROL SYSTEM FOR RESERVE LOCKING INFRASTRUCTURE NODES FOR SUBSEQUENT EXCLUSIVE AND SHARE LOCKING BY THE SYSTEM

[75] Inventor: John D. Jordan, Jr., Worthington, Ohio

[73] Assignee: AT&T Bell Laboratories, Murray Hill, N.J.

[21] Appl. No.: 452,093

[22] Filed: Dec. 18, 1989

[51] Int. Cl.⁵ .......................................... G06F 15/40
[52] U.S. Cl. ................................ 395/725; 364/246.6; 364/246.8; 364/282.1; 364/282.2; 364/DIG. 1
[58] Field of Search ............................. 364/200, 900

[56] References Cited

U.S. PATENT DOCUMENTS

| | | | |
|---|---|---|---|
| 4,604,694 | 8/1986 | Hough | 364/200 |
| 4,627,019 | 12/1986 | Ng | 364/900 |
| 4,677,550 | 6/1987 | Ferguson | 364/200 |
| 4,698,752 | 10/1987 | Goldstein et al. | 364/200 |
| 4,716,528 | 12/1987 | Crus et al. | 364/300 |
| 4,823,310 | 4/1989 | Grand | 364/900 |
| 4,827,411 | 5/1989 | Arrowood et al. | 364/300 |
| 4,827,508 | 5/1989 | Shear | 380/4 |
| 4,914,569 | 4/1990 | Levine et al. | 364/200 |
| 4,937,736 | 1/1990 | Chang et al. | 364/200 |
| 4,965,719 | 10/1990 | Shoens et al. | 364/200 |

OTHER PUBLICATIONS

"Multilevel Locking with Deadlock Avoidance", IBM Technical Disclosure Bulletin, vol. 21, No. 4, Sep. 1978, pp. 1723-1728.
"Efficient Locking for Concurrent Operation on B--Trees", ACM Transaction on Database System, vol. 6, No. 4, Dec. 1981, pp. 650-670.
"Transaction Monitoring in Encompass (TM): Reliable Distributed Transaction Processing", by Borr, Proceedings Internation Conference on Very Large Data Bases, Sep. 1981, pp. 244-245.
"Index Locking and Splitting", IBM Technical Disclosure Bulletin, vol. 25, No. 7B, Dec. 1985, pp. 3725-3927.
"Concurrent Operation on B-Tree with Overtaking", by Sagiv, ACM Sagaet-Sigmond Symposium on Principles of Database System, Mar. 1985, 28-37.
"Locking Protocol for Concurrent Operation on B--Trees", IBM Technical Disclosure Bulletin, vol. 19, No. 10, Mar. 1977, pp. 3887-3889.
"Multi-Access Data Sharing Facility Utilizing Magnetic Bubble Storage", IBM Technical Disclosure Bulletin, vol. 23, No. 8, Jan. 1981, pp. 3882-3885.
"Ubiquitous B-Tree", Computer Surveys, vol. 11, No. 2, Jun. 1979, pp. 121-137.
"Locking Architecture in a Multiple Virtual Memory Multi-Processing System", IBM Technical Disclosure Bulletin, vol. 16, No. 7, Dec. 1973.
"Sharing of Disk Files Without Locking", IBM Technical Disclosure, vol. 22, No. 7, Dec. 1979, pp. 2887-2889.
"Integrated Concurrency and Shared Buffer Coherency Control for Multi-System," IBM Technical Disclosure Bulletin, vol. 28, No. 10, Mar. 1986, pp. 4642-4650.
"Index Min-Pages", IBM Technical Disclosure Bulletin, vol. 25, No. 11A, Apr. 1983, 5460-5463.
"Operating Systems-An Advanced Course," Messrs. M. J. Flynn, J. N. Gray, A. K. Jones, K. Lagally, H. Opderbeck, G. J. Popek, B. Randel, J. H. Saltzer and H. R. Wiehle, *Springer-Verlag,* New York-Berlin-Heidelberg-Tokyo, Third printing, 1984, pp. 430 through 450.
"Object-Oriented Concepts and Data Bases and Applications," Messrs. Won Kim and F. H. Lochovsky, *Addison-Wesley,* 1989, pp. 270 through 273.

*Primary Examiner*—Allen R. MacDonald
*Assistant Examiner*—Ayaz R. Sheikh
*Attorney, Agent, or Firm*—Dwight A. Marshall

[57] ABSTRACT

Apparatus and method for controlling concurrent process access of infrastructures. The apparatus and method selectively locks nodes and tree structures to reserve lock a node and tree structure for subsequent exclusive and share locking by a process. Currently running processes have share read only access to the reserved locked node and tree structure until a subsequent exclusive lock is applied by the process to the reserve locked node and tree structure.

16 Claims, 4 Drawing Sheets

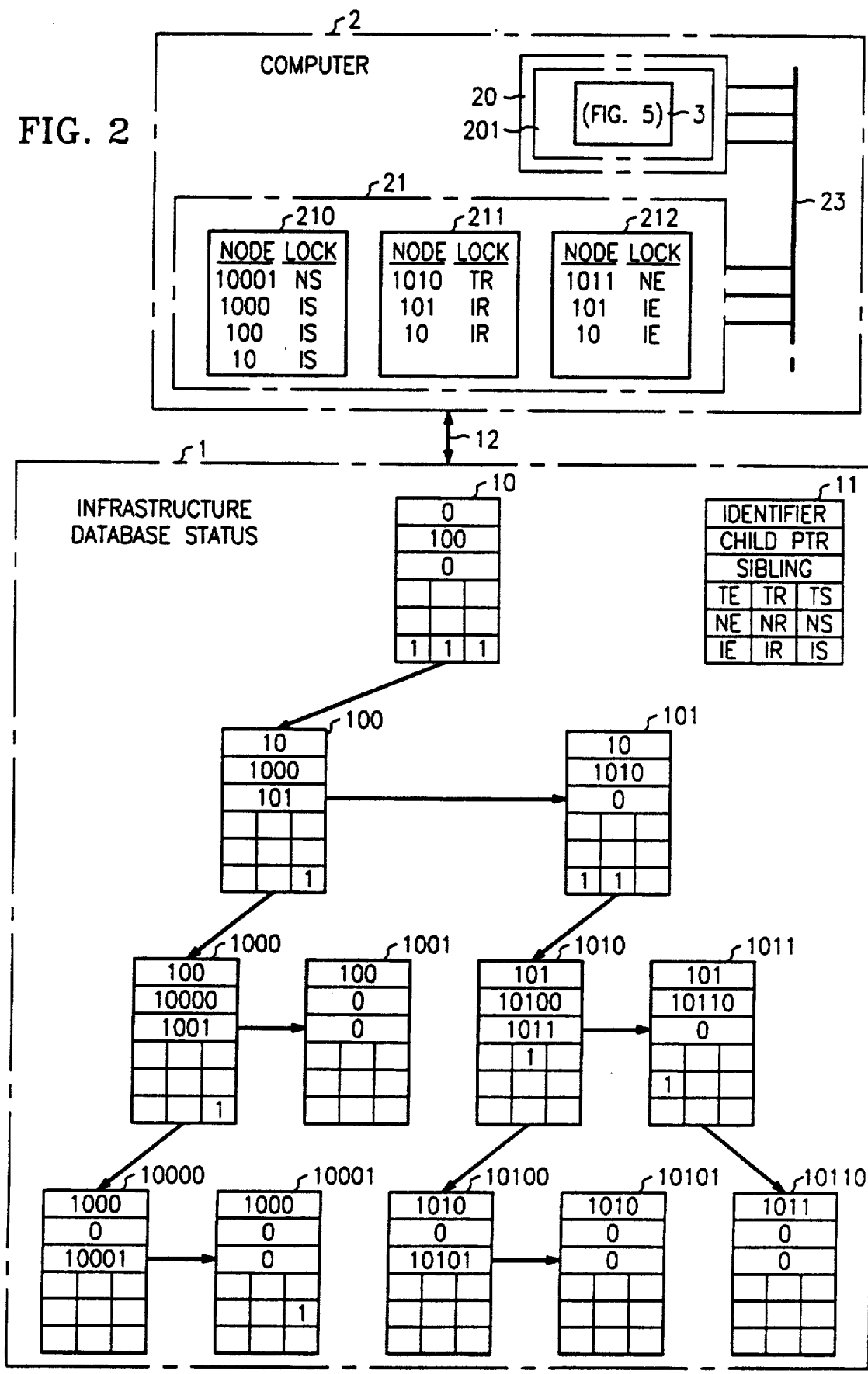

TABLE 1

| TYPE LOCK | ANCESTOR LOCK |
|---|---|
| TREE EXCLUSIVE (TE) | INTERMEDIATE EXCLUSIVE (IE) |
| NODE EXCLUSIVE (NE) | INTERMEDIATE EXCLUSIVE (IE) |
| TREE RESERVE (TR) | INTERMEDIATE RESERVE (IR) |
| NODE RESERVE (NR) | INTERMEDIATE RESERVE (IR) |
| INTERMEDIATE RESERVE (IR) | INTERMEDIATE RESERVE (IR) |
| INTERMEDIATE EXCLUSIVE (IE) | INTERMEDIATE EXCLUSIVE (IE) |
| TREE SHARE (TS) | INTERMEDIATE SHARE (IS) |
| NODE SHARE (NS) | INTERMEDIATE SHARE (IS) |
| INTERMEDIATE SHARE (IS) | INTERMEDIATE SHARE (IS) |

FIG. 3

TABLE 2

|    | TE | NE | TR | NR | IR | IE | TS | NS | IS |
|----|----|----|----|----|----|----|----|----|----|
| TE | ✓ | ✓ | ✓ | ✓ | ✓ | ✓ | ✓ | ✓ | ✓ |
| NE | ✓ | ✓ | ✓ | ✓ |   |   | ✓ | ✓ |   |
| TR | ✓ | ✓ | ✓ | ✓ | ✓ | ✓ |   |   |   |
| NR | ✓ | ✓ | ✓ | ✓ |   |   |   |   |   |
| IR | ✓ |   | ✓ |   |   |   |   |   |   |
| IE | ✓ |   | ✓ |   |   |   | ✓ |   |   |
| TS | ✓ | ✓ |   |   |   | ✓ |   |   |   |
| NS | ✓ | ✓ |   |   |   |   |   |   |   |
| IS | ✓ |   |   |   |   |   |   |   |   |

FIG. 4

INFORMATION CONTROL SYSTEM FOR RESERVE LOCKING INFRASTRUCTURE NODES FOR SUBSEQUENT EXCLUSIVE AND SHARE LOCKING BY THE SYSTEM

CROSS-REFERENCE TO RELATED APPLICATIONS

This application is related to the following applications, which are assigned to the same assignee and concurrently filed herewith:

J. D. Jordan, Jr., Case 1, "Information Control System";

J. D. Jordan, Jr., Case 3, "Information Control System";

J. D. Jordan, Jr., Case 4, "Information Control System"; and

J. D. Jordan, Jr., Case 5, "Information Control System."

1. Technical Field

The invention relates to apparatus and method for controlling process operations against composite information infrastructures.

2. Background and Problem

Composite infrastructures such as data base systems used with computer systems oftentimes have an information architecture environment consisting of interconnected complex object nodes. Each object node may have independent tree-like structures comprising hierarchies of interconnected complex subordinate object nodes of information wherein each subordinate object node may further compise independent sub-tree structures of interconnected sub-nodes of information.

Computer systems using infrastructures run processes wherein the processes concurrently access the infrastructures. In particular, a computer system may run a number of processes each of which requires access to a data base comprising a composite infrastructure. A process may require access to one, several or all of the infrastructure nodes many times during the running of the process. In order to insure continuity of operation, a process may apply an exclusive lock against a node that will operate against the node and implicitly against all the lower hierarchical subordinate and sub-nodes in the tree structure of the node to allow only the process holding the exclusive lock to write into and read information from the node. In addition, ancestor nodes of the node assigned an exclusive lock are assigned an intermediate exclusive lock to ensure a consistency of information. During the time that a process holds the exclusive lock, other processes concurrently running on computers served by the complex infrastructure are prevented from writing into and reading information from the node and subordinate nodes and sub-nodes located in the tree structure of the node to which the exclusive lock was applied. A process may also apply a share lock against a node and the node tree structure and an intermediate share lock against ancestor nodes of the share locked node. The share and intermediate share lock allows the process and other processes to only read information from the nodes and operates to prevent a process from applying an exclusive lock thereto.

A problem arises during concurrent operation of multiple processes in that when one process exclusively locks a node or tree structure, other ones of the processes that require access to the exclusively locked node or tree structure must be delayed until the exclusive lock is removed. Similarly, a share lock applied to a node and tree structure prevents other processes from applying an exclusive lock thereto until such time as the share lock can be removed. Another problem arises in that a running process required to apply either an exclusive or share lock at a later time may be halted when concurrently running processes apply locks before the running process can execute the appropriate command.

3. Solution

The foregoing problems are solved by apparatus and method arranged to control concurrent process operations against a complex infrastructure comprising tree structures of complex object nodes. The method and apparatus enables processes to exclusively lock complex nodes and tree structures such that a process having applied the exclusive lock may write data into and read data from the exclusively locked nodes and to share lock complex nodes and tree structures such that multiple processes may concurrently read data from the share locked nodes. The method and apparatus selectively locks ones of the nodes and tree structures to reserve a node and tree structure for subsequent exclusive and share locking by a process at a time designated by the process while enabling other ones of concurrently running processes to share access to the reserve locked nodes until a subsequent exclusive lock has been applied to the node.

BRIEF DESCRIPTION OF THE DRAWING

FIG. 2 sets forth illustrative processes and a computer operation system used with the information control system of FIG. 1;

FIG. 3 sets forth an illustrative table showing a relationship of complex node and tree structure locks with corresponding intermediate locks applicable to ancestral nodes and tree structures related to a selected complex node and tree structure;

FIG. 4 illustrates a table setting forth an incompatibility and a compatibility of selected locks with current lock status of selected nodes and tree structures and ancestral node and tree structures.

DETAILED DESCRIPTION

Figure 1:
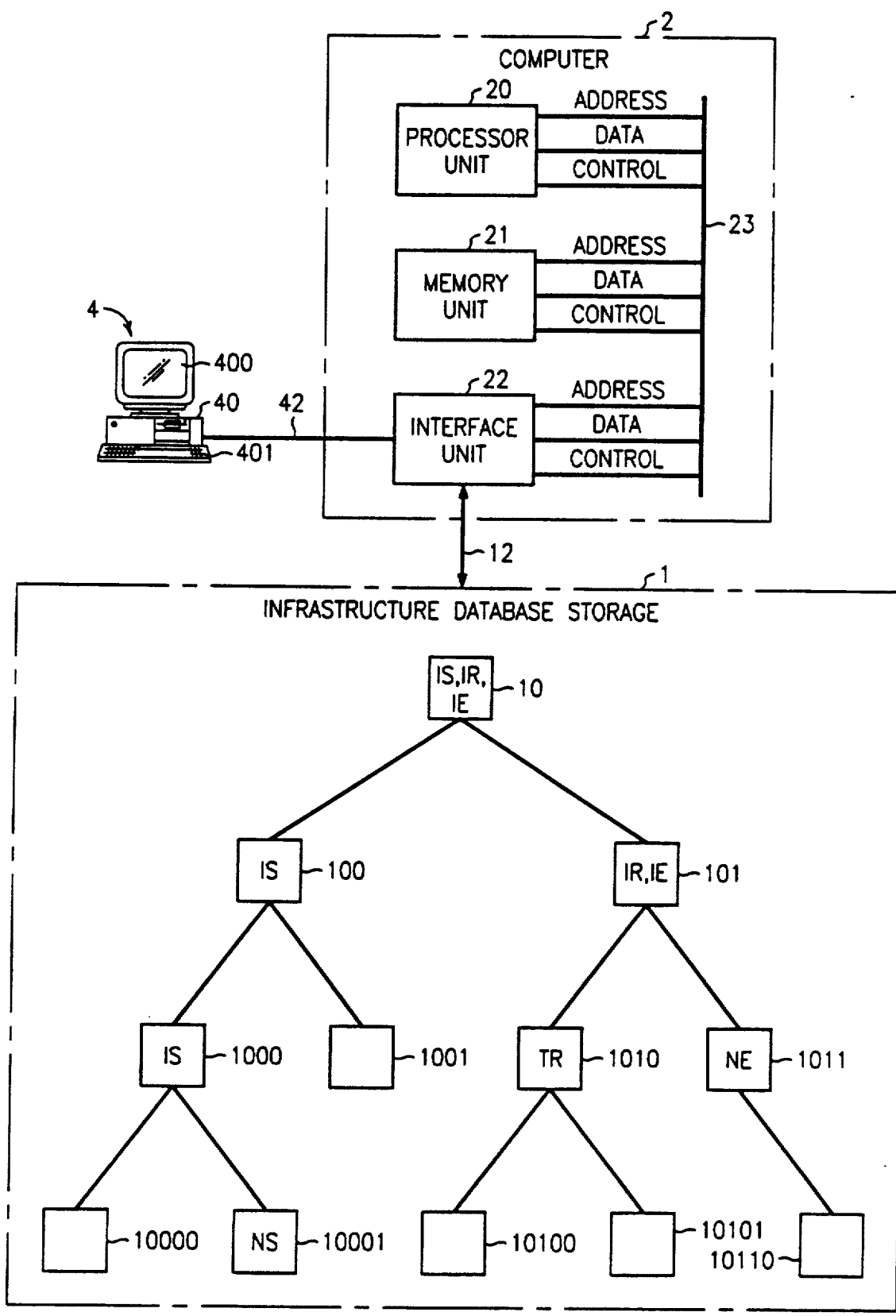
FIG. 1 illustrates an information control system embodying the principles of the invention.

In an exemplary embodiment of the invention, FIG. 1, an information control system has a storage system, such as a data base, intended for use with a single or number of computer systems such as computer system 2. A data base, hereinafter referred to as infrastructure 1, may have a single or number of infrastructures 1 stored therein that may be used by processes running within computer system 2. Each infrastructure 1 comprises information required for process operation or may be software programs and macros that may be accessed during the operation of a process and used by the process in the execution of various process features.

A typical infrastructure 1, may have a root node 10 and a number of interconnected complex nodes 100, 101 each of which may, in an embodiment of the invention, be a file of information. Each complex node 100, 101, hereinafter referred to as a file node 100, 101, may have independent tree-like structures comprising hierarchies of interconnected complex subordinate nodes 1000, 1001, 1010, 1011 which may be blocks of information and which are hereinafter referred to as block nodes 1000, 1001, 1010, 1011. A complex subordinate node or block node 1000, 1001, 1010, 1011 may have independent sub-tree structures of interconnected sub-nodes 10000, 10001, 10100, 10101, 10110 of information and which are hereinafter referred to as information nodes. In the embodiment of the invention, infrastructure 1 has two file nodes 100, 101 interconnected with root node 10. File node 100, for example, may have two independent tree structures, one tree structure which includes block node 1001 and the other tree structure, a two level hierarchy tree structure comprising block node 1000. Block node 1000 has two independent sub-tree structures one of which includes information node 10000 and the other information node 10001. File node 101 is also assumed to have two independent tree structures, one tree structure which comprises a two level hierarchy of block node 1011 and information node 10110 and the other which comprises a two level hierarchy of block node 1010 which in turn has a sub-tree structure comprising information nodes 10100, 10101. It is to be understood that other configurations of infrastructure 1 are within the teaching of the invention and the invention is not limited by the specific structure of infrastructure 1.

Infrastructure 1 may be accessed by one or a number of computers such as computer 2. Computer 2 may be any of a number of different types of computers, such as an AT&T 3B2-400 and 3B2-310 simplex or duplex computers. Such computers need not be described in detail for an understanding of the invention and in general have a processor unit 20, memory unit 21 and an interface unit 22 each connected by address, data and control leads to a data bus 23. Interface unit 22 couples data links 12 and 42 extending, respectively, to infrastructure 1 and computer terminal 4 with bus 23 so that data may be exchanged with computer 2 by computer terminal 4 and infrastructure 1. Computer terminal 4, which may be any of a number of well-known computer terminals or personal computers, is coupled to interface unit 22 so that information may be entered into and read from processor unit 20 and memory unit 21 by computer terminal 4. Computer terminal 4 may also have, but not necessarily limited thereto, a processing unit 40, an input device, such as keyboard 401, and a display device similar to CRT terminal 400.

It is to be understood that infrastructure 1 may be located remote from computer 2 and coupled therewith by data links 12. In addition, infrastructure 1, within the teaching of the invention, may be coupled to a number of computers 2 either by data links, such as data link 12, or by a communication network sometimes referred to as a ring or star-type of network. Although FIG. 1 of the drawing shows infrastructure 1 coupled by data link 12 with interface unit 22, it is to be understood that infrastructure 1 could be resident as a data base in a memory storage device that could be a part of a mainframe computer and coupled with data bus 23 such that processes controlling the operation of the mainframe computer could access infrastructure 1.

Each complex node of infrastructure 1, FIG. 2, corresponds with a register configured in accordance with key 11 wherein each node identifies the ancestor of the node. In addition, each node has a child identifier therein specifying a dependent child of the node and an identifier denoting a sibling having the same ancestor as the node. For example, block node 1010 has an identifier of 101 identifying file node 101 as a direct ancestor of block node 1010. The child pointer information identifies information node 10100 as a child of block node 1010 and the sibling information identifies block node 1011 having the same ancestor node 101 as does block node 1010.

Each complex node of infrastructure 1 also includes information indicating the current lock status of the node. Such information is assumed for the present embodiment of the invention to be a register, although not limited thereto. A register, shown in key 11, records the current lock status of a node and tree structure of infrastructure 1. For example, a node register may indicate that tree exclusive TE, share TS and reserve TR locks have been imposed on a node. Each node register may also indicate that node exclusive NE, share NS and reserve NR locks, in addition to intermediate exclusive IE, share IS and reserve IR locks, have been imposed on a node. As an example, root node 10 register indicates that intermediate exclusive IE, reserve IR and share IS locks have been imposed on root node 10.

In the operation of the information control system, processes 210, 211, 212, resident in memory unit 21 of computer 2, are run in processor unit 20 with program 3 to control access to infrastructure 1. If process 210 requires the reading of information from information node 10101, computer 2 accesses infrastructure 1, FIG. 2, via data link 12. Root node 10 register initiates the selection of information node 10101 by a child identifier which signifies child file node 100. File node 100 directs process 210 to sibling file node 101 which in turn points to child block node 1010. Block node 1010 points to information node 10100 which identifies sibling information node 10101. In order to write into or read information from information node 10101, process 210, via operation of program 3, must determine the current lock status of information node 10101, FIG. 1, ancestor block node 1010, file node 101 and root node 10.

Computers, such as computer 20, having access to infrastructure 1, may run multiple process operations that require concurrent access to the nodes and tree structures of infrastructure 1. A process may enable the apparatus to selectively lock ones of the nodes and tree structures so as to reserve lock a node and tree structure such that the process may at a subsequent time apply an exclusive or share lock against the reserve locked node. The apparatus of the invention responds to a process request for a lock by selecting the appropriate node identified by the process and generating a list of ancestral nodes related to the selected node. If, for example, process 211, FIG. 2, requests that a tree reserve TR lock be applied against block node 1010, program 3 generates a list of ancestral nodes, FIG. 1, comprising root node 10, file node 101 and selected block node 1010.

The apparatus operating under control of program 3, FIG. 2, selects root node 10 from the generated list of ancestral nodes and determines in accordance with table 1, FIG. 3, that an intermediate reserve IR lock is required to be applied against an ancestral node, such as root node 10, when the requested tree reserve TR is to be applied against a child node such as block node 1010. The compatibility of the ancestral node intermediate type of lock as determined by table 1 is compared for compatibility, FIG. 4, table 2, with the current lock status identifying locks that are currently applied against the ancestral node. Each lock applied against a node or tree structure, FIG. 2, is recorded as a current lock status in a register corresponding with each node and in the format set forth as key 11. As set forth in compatibility table 2, FIG. 4, intermediate reverse IR lock is compatible with node exclusive NE and with tree, node and intermediate share TS, NS, IS locks and node and intermediate reserve NR, IR and intermediate exclusive IE locks. Thus, the instant intermediate reserve IR lock may be applied against root node 10 even though the current register status of root node 10 may indicate that node exclusive NE and tree, node and intermediate share TS, NS, IS locks and node and intermediate reserve NR, IR and intermediate exclusive IE locks are currently pending against root node 10. Intermediate reserve IR lock is incompatible with tree exclusive TE and tree reserve TR locks if the register corresponding therewith shows that these locks are currently pending against root node 10 by other processes.

When it is determined that intermediate reserve IR lock is compatible with the current lock status of root node 10, the current lock status of root node 10 is updated by setting the register corresponding with root node 10 to indicate that an intermediate reserve IR lock is currently pending against root node 10. Following the setting of registers to record that an intermediate reserve IR lock is currently applied against ancestral root node 10 and file node 101, FIG. 2, program 3 determines the compatibility of the requested tree reserve TR lock with the current lock status of block node 1010. In accordance with compatibility table 2, FIG. 4, tree reserve TR lock is compatible with tree, node and intermediate share TS, NS, IS locks and is incompatible with all other locks. Unless tree, node and intermediate exclusive or reserve TE, NE, IE, TR, NR, IR locks are currently pending against block node 1010, the register of block node 1010, FIG. 2, is updated to record that a tree reserve TR lock is currently pending against block node 1010.

When the apparatus, operating in accordance with program 3, detects that a tree reserve TR lock has been applied against the selected block node 1010, other processes are prevented from obtaining exclusive and reserve locks on selected block node 1010 in that, FIG. 4, table 2, tree and node exclusive and reserve TE, NE, TR, NR, locks and intermediate exclusive and reserve IE, IR locks are not compatible with the tree reserve TR lock currently applied to block node 1010. As set forth in compatibility table 2, concurrently running processes may apply tree, node and intermediate share TS, NS, IS locks against selected nodes having a lock status indicating that a tree reserve TR lock is currently pending against the selected node. If a tree reserve TR lock is applied to block node 1010, then other processes may only obtain tree, node and intermediate share TS, NS, IS locks on child information nodes 10100, 10101. In addition, only node exclusive and reserve NE, NR, tree and node share TS, NS and intermediate exclusive, reserve and share IE, IR, IS locks may be applied to ancestral root and file nodes 10, 101.

In the present embodiment of the invention, it is assumed that initially infrastructure 1, FIG. 2, is free of all locks and that all node registers are clear. It is further assumed that process 210, currently running on computer 2, has a request to place a node share NS lock on information node 10001. Program 3, running under control of process 210, FIG. 5, selects information node 10001, step 301, and the type of lock, such as node share lock NS, to be applied to selected information node 10001, step 302. Program 3 then asks if there are ancestor nodes, step 303, and when it is determined that there are ancestor nodes, step 304, generates a list of the appropriate ancestor nodes. The ancestor list for information node 10001, FIG. 1, includes root node 10, file node 100, block node 1000 and information node 10001.

Figure 5:
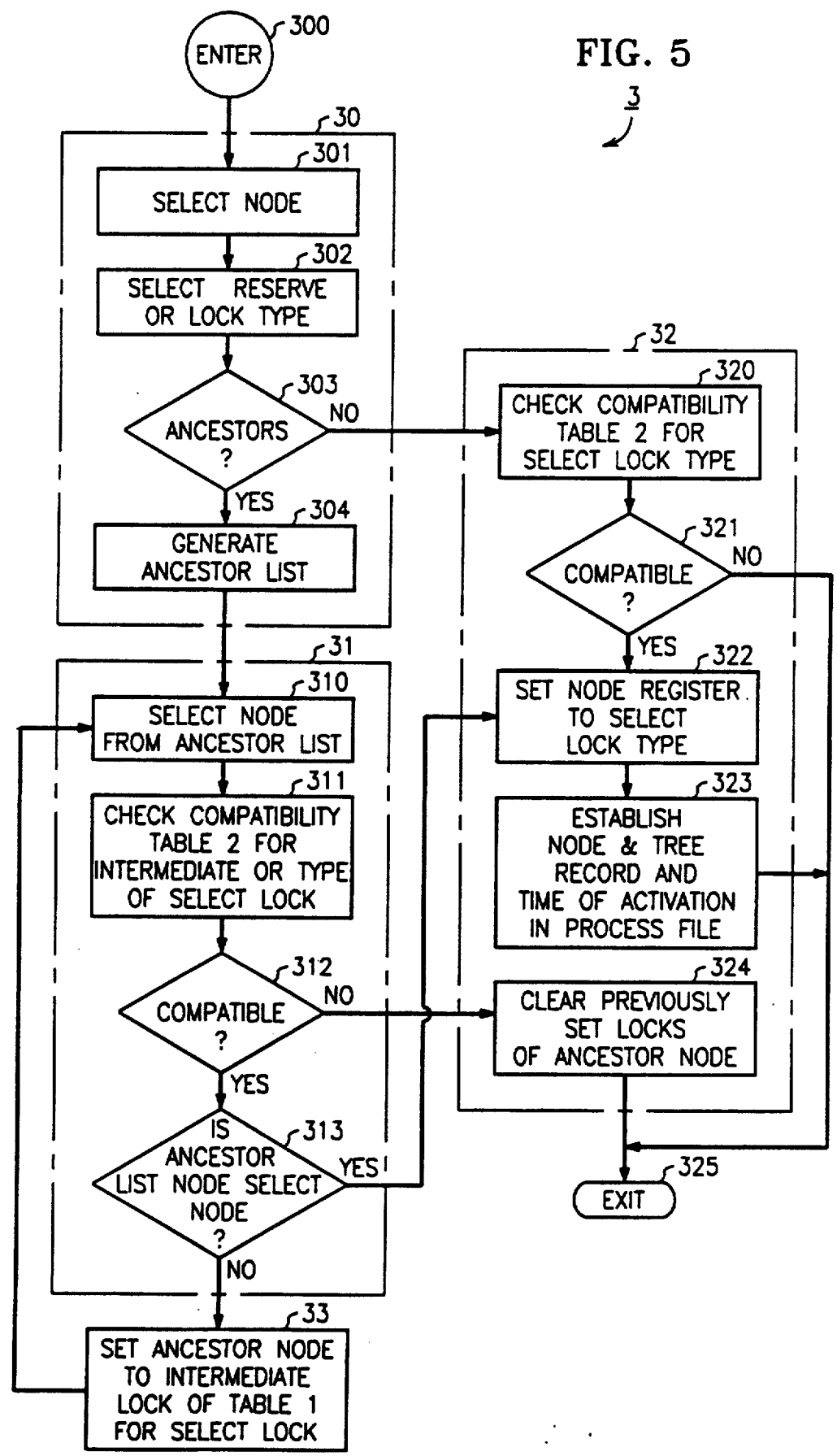
FIG. 5 illustrates a flow chart of the operation of the information control system set forth in FIGS. 1 and 2 in accordance with the principles of the invention.

Program 3, step 310, FIG. 5, selects the first ancestor node, root node 10, and determines from table 1, FIG. 3, that an intermediate share IS lock is required for each ancestor node when a node share NS lock is to be applied to a child node. The compatibility of the intermediate share IS lock, step 311, FIG. 5, is determined by comparing intermediate share IS lock with any locks that have previously been applied to root node 10 as indicated by the register corresponding therewith. When it is determined, step 312, that intermediate share IS lock, table 2, FIG. 4, is compatible with any locks that hve previously been applied to root node 10, program 3 determines if root node 10 is the selected node to which the selected lock is to be applied, step 313. Since infrastructure 1 is assumed to be initially free of locks, root node 10 register does not record any lock, and it is determined that in intermediate share IS lock can be applied to root node 10. When it is determined that root node 10 is not the selected information node 10001, step 313, program 3 sets ancestor root node 10 to the intermediate type of lock identified by table 1, FIG. 3. Since process 210, FIG. 2, intends to apply a node share NS lock to information node 10001, table 1, FIG. 3, determines that an intermediate share IS lock is to be applied to an ancestor node such as root node 10 of information node 10001. Thus, root node 10 register is set to indicate that an intermediate share IS lock has been applied thereto, FIG. 5, step 33.

Program 3, step 31, continues to compare the compatibility of the intermediate share IS lock with the recorded lock status of each listed ancestral node, FIG. 1, of child information node 10001 by repeating steps 310 through 313. Since infrastructure 1 was initially free of locks, intermediate share IS lock is compatible with file and block nodes 100, 1000, respectively, that are the listed ancestors of information node 10001, and the registers thereof, FIG. 2, are set to indicate that an intermediate share IS lock has been applied to each, step 33.

After setting the register of ancestor node 1000 to indicate that an intermediate share IS lock has been applied thereto, step 33, FIG. 5, program 3 selects the next node from the ancestor list, step 310, which is the selected child information node 10001 identified at step 301. The selected lock type to be applied to information node 10001, node share NS, is compared as set forth by table 2, FIG. 4, with any previously set locks recorded by the register of information node 10001, FIG. 2. Since information node 10001 is initially free of any locks, it is determined that the selected node share NS is compatible with information node 10001, step 312. Since information node 10001 is the selected node, steps 313, 322, the register of information node 10001, FIG. 2, is set to record that a node share NS lock has been applied thereto. Program 3, FIG. 5, step 323, establishes a node and tree record of the locks currently applied to infrastructure 1, FIG. 2, in process 210 indicating that a node share NS lock has been applied to information node 10001 and intermediate share IS locks applied to ancestor nodes comprising block node 1000, file node 100 and root node 10. In addition, registers corresponding with root, file, block and information nodes 10, 100, 1000, 10001 have been set to record that intermediate share IS and node share NS locks have been applied to nodes of infrastructure 1. Program 3, FIG. 5, then exits, step 325, from lock sequence 3.

Computer 2 may concurrently run process 211, with process 210, FIG. 2, which requests that a tree reserve TR lock be applied to block node 1010 so that process 211 may subsequently apply exclusive or reserve locks to block node 1010 and child information nodes 10100, 10101. A tree reserve TR lock prevents other concurrently running processes from obtaining either exclusive or reserve locks on reserve locked block node 1010 and child nodes 10100, 10101. Program 3 responds to the lock request of process 211 by selecting block node 1010, FIG. 5, step 301, and the type of lock identified as a tree reserve TR lock by process 211, step 302. It is determined, step 303, that selected block node 1010 has ancestor nodes and a list thereof is generated, step 304, which includes root, file and block nodes 10, 101, 1010. Root node 10, step 310, is selected from the generated ancestor list.

When it is requested that a tree reserve TR lock be applied to a child node, such as block node 1010, table 1, FIG. 3, stipulates that an intermediate reserve IR lock is to be selected and applied to each ancestor node, FIG. 1, of block node 1010, such as file and root nodes 101 and 10, respectively. The compatibility of the selected intermediate reserve IR lock, FIG. 5, step 311, is compared to the current status of locks recorded in the register of root node 10 in accordance with table 2, FIG. 4. Table 2 determines that an intermediate reserve IR lock is compatible with the intermediate share IS lock currently recorded in the register corresponding with root node 10, FIG. 5, step 312. Since root node 10 is not selected block node 1010, steps 313, 33, the register of root node 10, FIG. 2, is set to record that an intermediate reserve IR lock, in addition to an intermediate share IS, has been applied against root node 10 by process 211.

File node 101, FIG. 5, is selected from the generated ancestor list, step 310, and since file node 101 does not have a lock currently recorded in the register thereof, the register of file node 101, FIG. 2, is set to record that an intermediate reserve lock has been applied against file node 101, FIG. 5, steps 311, 312, 313 and 33. Program 3 next selects block node 1010 from the ancestor list, step 310. Since tree reserve TR lock is to be applied against block node 1010 and the current lock status of the register of block node 1010 is currently empty, table 2, FIG. 4, indicates that tree reserve TR is compatible with block node 1010, FIG. 5, steps 311, 312. Program 3 determines that block node 1010 is the select node, step 313, to which the select tree reserve TR lock is to be applied and sets block node 1010 register, step 322, to record that tree reserve TR lock is being applied against block node 1010, FIG. 2. A record is established in process 211 indicating that a tree reserve TR lock has been applied against block node 1010 and that intermediate reserve IR locks have been applied against ancestor file and root nodes 101 and 10, respectively, and program 3, FIG. 5, then exits from lock sequence 3, FIG. 5, steps 323 and 325.

Process 212, FIG. 2, requests that a node exclusive NE lock be applied to block node 1011. Program 3, FIG. 5, steps 301 through 304, generates an ancestor list identifying root node 10 and file node 101 as the ancestors of selected block node 1011. The first ancestor root node 10 is selected, step 310, and table 1, FIG. 3, determines that an ancestor lock intermediate exclusive IE lock is to be applied thereto. The intermediate exclusive IE lock is compared with the current lock status recorded in the register corresponding with root node 10, FIG. 5, steps 311, 312. In accordance with table 2, FIG. 4, intermediate exclusive IE lock is compatible with the intermediate reserve IR and share IS locks currently recorded in the register of root node 10. The ancestor root node 10 register, FIG. 2, is updated to record that intermediate exclusive IE lock has been applied against root node 10, FIG. 5, steps 313 and 33. Since intermediate exclusive IE lock, FIG. 4, table 2 is compatible with the intermediate reserve IR lock currently recorded in ancestor file node 101 register, FIG. 2, the register is updated to record that the intermediate exclusive IE lock is applied against file node 101, FIG. 5, steps 31 and 33. Repeating step 31, program 3 determines that the requested node exclusive NE lock is compatible with block node 1011 which currently has no recorded locks. Since block node 1011 is the select node, step 313, the register of block node 1011, FIG. 2, is set to record that a node exclusive NE lock has been applied to block node 1011 and process 212 is set to record that a node exclusive NE lock is applied to block node 1011 and intermediate exclusive IE locks applied to ancestor file and root nodes 101 and 10. Program 3 exits from lock sequence 3, FIG. 5, step 325.

If the select node, step 301, for example was root node 10, there would be no ancestor nodes, step 303, and program 3 would check table 2, FIG. 4, to determine the compatibility of the lock to be applied to root node 10 with the current lock status of root node 10 as recorded in the register thereof, step 321. If the selected lock was not compatible with the previous locks recorded in the root node 10 register, program 3 would exit from the lock sequence, step 321. If the selected lock was compatible, step 321, the register would be set to record that the select lock had been applied to the select node and a record established in the appropriate process before exiting the lock sequence, steps 322 through 325.

If a process requested that a node exclusive NE lock be applied against block node 1010, FIG. 2, program 3 would determine, tables 1, 2, FIGS. 3 and 4, that an intermediate exclusive IE lock is compatible with the current lock status, FIG. 2, indicating that intermediate exclusive, share and reserve IE, IS, IR and intermediate exclusive and reserve IE, IR locks are currently pending against ancestral root and file nodes 10, 101, respectively. When it is determined that the requested node exclusive NE lock, FIG. 5, steps 311, 312, is incompatible with the current register status indicating that a tree reserve TR lock, FIG. 2, is current pending against selected block node 1010, table 2, FIG. 4, program 3, FIG. 5, steps 324, 325, clears any intermediate exclusive IE locks previously applied to ancestral root and file nodes 10, 101 during previously run steps 31 and 33 and exits from the lock sequence.

If a process requested that a node share NS lock be applied against block node 1010, FIG. 2, program 3 would determine, tables 1, 2, FIGS. 3 and 4, that an intermediate share IS lock is compatible with the current lock status, FIG. 2, indicating that intermediate exclusive, share and reserve IE, IS, IR and intermediate exclusive and reserve IE, IR locks are currently pending against ancestral root and file nodes 10, 101, respectively. When it is determined that the requested node share NS lock, steps 311, 312, is compatible with the current register status indicating that a tree reserve TR lock, FIG. 2, is current pending against selected block node 1010, table 2, FIG. 4, program 3, FIG. 5, steps 312, 322, sets the register corresponding with select block node 1010 to record that a node share NS has been applied thereto. A record is established showing intermediate share locks are currently pending against ancestral nodes 10, 101 and a node share lock against block node 1010 thereby enabling processes to concurrently read information therefrom.

I claim:

1. Apparatus for controlling concurrent process operations against a complex infrastructure comprising tree structures of complex object nodes wherein said apparatus comprises means responsive to requests of the process operations for exclusively locking nodes and tree structures to enable the requesting process operations to write information into and read information from said exclusively locked nodes and for share locking nodes and tree structures to enable multiple ones of the process operations to read information from said share locked nodes, and means responsive to a request of one of the process operations for selectively reserve locking one of the nodes and tree structures to reserve the node and tree structure for subsequent exclusive and share locking by the process operation at a time designated by the process operation while enabling other ones of the process operations to share access to the reserve locked nodes until a subsequent exclusive lock is applied to said reserve locked node by said one of the process operations.

2. The infrastructure controlling apparatus set forth in claim 1 comprising means responsive to a process operation requesting a lock for a node for selecting said node and generating a list of ancestral nodes related to said selected node.

3. The infrastructure controlling apparatus set forth in claim 2 comprising means operative upon selecting said node and generating said list of ancestral nodes for comparing a compatibility of an intermediate lock corresponding with said requested lock of each listed ancestral node with a current lock status of the ancestral node.

4. The infrastructure controlling apparatus set forth in claim 3 comprising means operative upon determination of compatibility of said intermediate lock with each ancestral node current lock status for setting a register corresponding with the ancestral node to record an application of said intermediate lock corresponding with said requested lock to the ancestral node.

5. The infrastructure controlling apparatus set forth in claim 4 comprising means enabled upon setting all ancestral node registers to record application of said intermediate lock corresponding with said requested lock for locking said selected node in accordance with said requested lock.

6. The infrastructure controlling apparatus set forth in claim 5 comprising means operative upon detecting a recorded node and tree structure reserve lock for preventing other ones of the process operations from obtaining exclusive and other reserve locks on said node and tree structures having recorded said reserve lock.

7. The infrastructure controlling apparatus set forth in claim 6 comprising means operative upon detecting a reserve locked node and tree structure of the infrastructure for enabling said other process operations to apply share locks on said node and tree structures having recorded said reserve lock thereby enabling said other process operations to only read information from said reserve locked node and tree structures.

8. Apparatus for controlling concurrent process operations against a complex infrastructure comprising tree structures of complex object nodes wherein said apparatus comprises means responsive to a process operation requesting a lock for selecting a node and tree structure and generating a list of ancestral nodes related to said selected node and tree structure, means operative upon selecting said node and generating said list of ancestral nodes for comparing a compatibility of an intermediate lock corresponding with said requested lock of each listed ancestral node with a currently recorded ancestral node lock status, means operative upon determination of compatibility of said intermediate lock with each ancestral node current recorded lock status for applying said intermediate lock to said ancestral node, means enabled upon recording said intermediate lock as pending for all said ancestral nodes for comparing said requested lock with a current lock status of said selected node and when compatible therewith for locking said selected node in accordance with said requested lock, means operative upon detecting a reserve lock recorded in a node and tree structure for preventing other ones of the processes from obtaining exclusive and other reserve locks on said node and tree structure having recorded said reserve lock, and means operative upon detecting a reserve lock recorded in a node and tree structure of the infrastructure for enabling said other processes to apply share locks on said node and tree structures having recorded said reserve lock thereby enabling said other processes to concurrently read information from said reserve locked node and tree structure nodes.

9. A computer implemented method for controlling concurrent process operations against a complex infrastructure having tree structures of complex object nodes comprising the steps of selectively locking one of the nodes and each ancestral tree structure node of the one node in response to a request of one of the process operations to reserve lock the node and tree structure ancestral nodes for subsequent exclusive and share locking by the process operation, and enabling other ones of the process operations to share access to the reserve locked nodes until a subsequent exclusive lock is applied to said reserve locked node by said one of the process operations.

10. The computer implemented method of controlling concurrent process operations against a complex infrastructure as set forth in claim 9 comprising the step of selecting the node in response to the process operation requesting a lock of the node and generating a list of ancestral nodes related to said selected node.

11. The computer implemented method of controlling concurrent process operations against a complex infrastructure as set forth in claim 10 comprising the step of comparing a compatibility of an intermediate lock corresponding with said requested lock of each listed ancestral node with a current lock status of the ancestral node.

12. The computer implemented method of controlling concurrent process operations against a complex infrastructure as set forth in claim 11 comprising the step of setting each ancestral node to an intermediate lock corresponding with said requested lock upon determination of a compatibility of said intermediate lock with each ancestral node current lock status.

13. The computer implemented method of controlling concurrent process operations against a complex infrastructure as set forth in claim 12 comprising the step of determining upon setting all ancestral nodes of said selected node to said intermediate lock a compatibility of said requested lock with a current lock status of said selected node and when compatible therewith locking and recording said requested lock in said selected node.

14. The computer implemented method of controlling concurrent process operations against a complex infrastructure as set forth in claim 13 comprising the step of preventing other ones of the process operations from obtaining exclusive and other reserve locks on said node and tree structure nodes having recorded said reserve lock.

15. The computer implemented method of controlling concurrent process operations against a complex infrastructure as set forth in claim 14 comprising the step of enabling said other process operations to apply share locks to said node and tree structure nodes having recorded said reserve lock thereby making it possible for said other process operations to read data from said reserve locked node and tree structures.

16. Computer apparatus for controlling concurrent process operations against a data base comprising tree structures of complex object nodes of information wherein said computer apparatus comprises means responsive to requests of the process operations for exclusively locking nodes and tree structures of nodes to enable the requesting process operations to write information into and read information from said exclusively locked nodes and for share locking said nodes and tree structures to enable multiple ones of the process operations to read information from said share locked nodes, and means responsive to requests of each of said process operations for selectively locking ones of the nodes and tree structures to reserve the node and tree structure for subsequent exclusive and share locking by said each process operation at a time designated by said each process operation while enabling other ones of the process operations to share access to the reserve locked nodes until a subsequent exclusive lock is applied by said each process operation to the reserve locked nodes.

* * * * *